United States Patent [19]

Nara et al.

[11] Patent Number: 5,179,543

[45] Date of Patent: Jan. 12, 1993

[54] DUBBING APPARATUS FOR AUDIO EQUIPMENT

[75] Inventors: Hideki Nara; Kazuya Miyamoto, both of Tokyo, Japan

[73] Assignee: Pioneer Electronic Corporation, Tokyo, Japan

[21] Appl. No.: 691,299

[22] Filed: Apr. 25, 1991

[30] Foreign Application Priority Data

Aug. 8, 1990 [JP] Japan .................................. 2-208022

[51] Int. Cl.⁵ ......................... G11B 27/02; G11B 7/28; G11B 27/024
[52] U.S. Cl. .......................................... 369/3; 369/85; 360/15
[58] Field of Search ......................... 369/84, 85, 1, 2, 3, 369/14, 15; 360/15, 57, 13; 381/104

[56] References Cited

U.S. PATENT DOCUMENTS 4,903,148  2/1990  Amano et al. .......................... 360/13
4,993,008  2/1991  Shiba ....................................... 369/3

FOREIGN PATENT DOCUMENTS 61-255575  11/1986  Japan ..................................... 369/84
63-131390  3/1988  Japan .
63-161581  5/1988  Japan .

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A dubbing apparatus for reproducing plural pieces of music recorded on an optical disc and a recording device for recording the reproduced music signals supplied from the reproducing device onto a magnetic tape. When the total recorded time of music on the disc is longer than the recordable time of the magnetic tape, the recording device stops recording each time the reproduction of each piece of music is finished, rewinds the magnetic tape for a specified period of time, and then starts recording the next piece of music while performing fade-in and fade-out actions on the two adjacent pieces of music during this overlapped recording period, thereby reducing the overall music recording time. This allows all pieces of music on the disc to be dubbed into the magnetic tape within the recordable time of the latter.

8 Claims, 3 Drawing Sheets

DUBBING APPARATUS FOR AUDIO EQUIPMENT

BACKGROUND OF THE INVENTION

1. Field of the Invention

The present invention relates to a dubbing apparatus for audio equipment which reproduces music information from optical discs and digital audio tapes and records it on magnetic tapes such as cassette tapes.

2. Prior Art

A dubbing apparatus is known, in which a plurality of pieces of music recorded on a compact disc (or CD) are reproduced one after another by a CD player and recorded on magnetic tapes such as cassette tapes.

The CD recorded time and the recordable time of magnetic tape seldom coincide an this gives rise to the following inconveniences. When the CD recorded time is longer than the recordable time of the magnetic tape, the music being recorded into tape is interrupted halfway. When the CD recorded time is shorter than the recordable time of the magnetic tape, a relatively long, unrecorded portion remains at the end of the tape.

To solve this problem some apparatuses have been proposed. To cite one example, there is an audio equipment (Japanese Patent Preliminary Publication No. Showa 63-131390) which compares the CD recorded time and the recordable time of magnetic tape and displays the number of pieces of music that can be completely recorded into the magnetic tape as well as the recordable time. Another example is a compact disc player with a record assist function (Japanese Patent Preliminary Publication No. Showa 63-161581), which displays information indicating whether the pieces of music selected by the user can be completely recorded into the magnetic tape.

With the above conventional apparatuses, the user can have the information about the number of pieces of music that can be recorded into magnetic tape, the recordable time, and whether the selected pieces of music can completely be recorded into the magnetic tape. Despite this advantage, when the CD recorded time is found longer, even slightly, than the recordable time of the magnetic tape, the user has to replace the tape with other magnetic tape with a longer recordable time. In that case, however, a long unrecorded portion may result at the end of the tape.

SUMMARY OF THE INVENTION

The present invention has been accomplished to overcome the above drawbacks and its objective is to provide a dubbing apparatus for audio equipment which, even when the total playback time of all pieces of music recorded on the CD is longer than the recordable time of the magnetic tape, can record these music of the CD completely into the magnetic tape within the recordable time.

To achieve the above objective, a dubbing apparatus for audio equipment of this invention comprises: a reproducing device for reproducing a plurality of pieces of music recorded on an optical disc or digital audio tape and outputting the reproduced music as music signals; and a recording device for dubbing the reproduced music signals to a magnetic tape, said recording device being adapted to stop recording each time the reproduction of each piece of music is completed, to rewind the magnetic tape for a duration equal to the sum of a reduction tim of the recorded piece of music and a cross fade time, and to start recording, from the rewound position, the music signal of the next piece of music being reproduced by the reproducing device while at the same time gradually lowering the recording level of the previously recorded piece of music for the duration of the cross fade time, thus overlapping the two adjacent pieces of music in the cross fade time.

With this invention, even when the total playback time of plural pieces of music recorded on an optical disc or digital audio tape is longer than the recordable time of a magnetic tape, it is possible to record these pieces of music within the recordable time of the magnetic tape by cutting off the end portion of the previously recorded piece of music and by recording the next piece of music so as to overlap the beginning portion of the next piece over the last part of the previously recorded piece of music.

PREFERRED EMBODIMENT OF THE INVENTION

Figure 1:
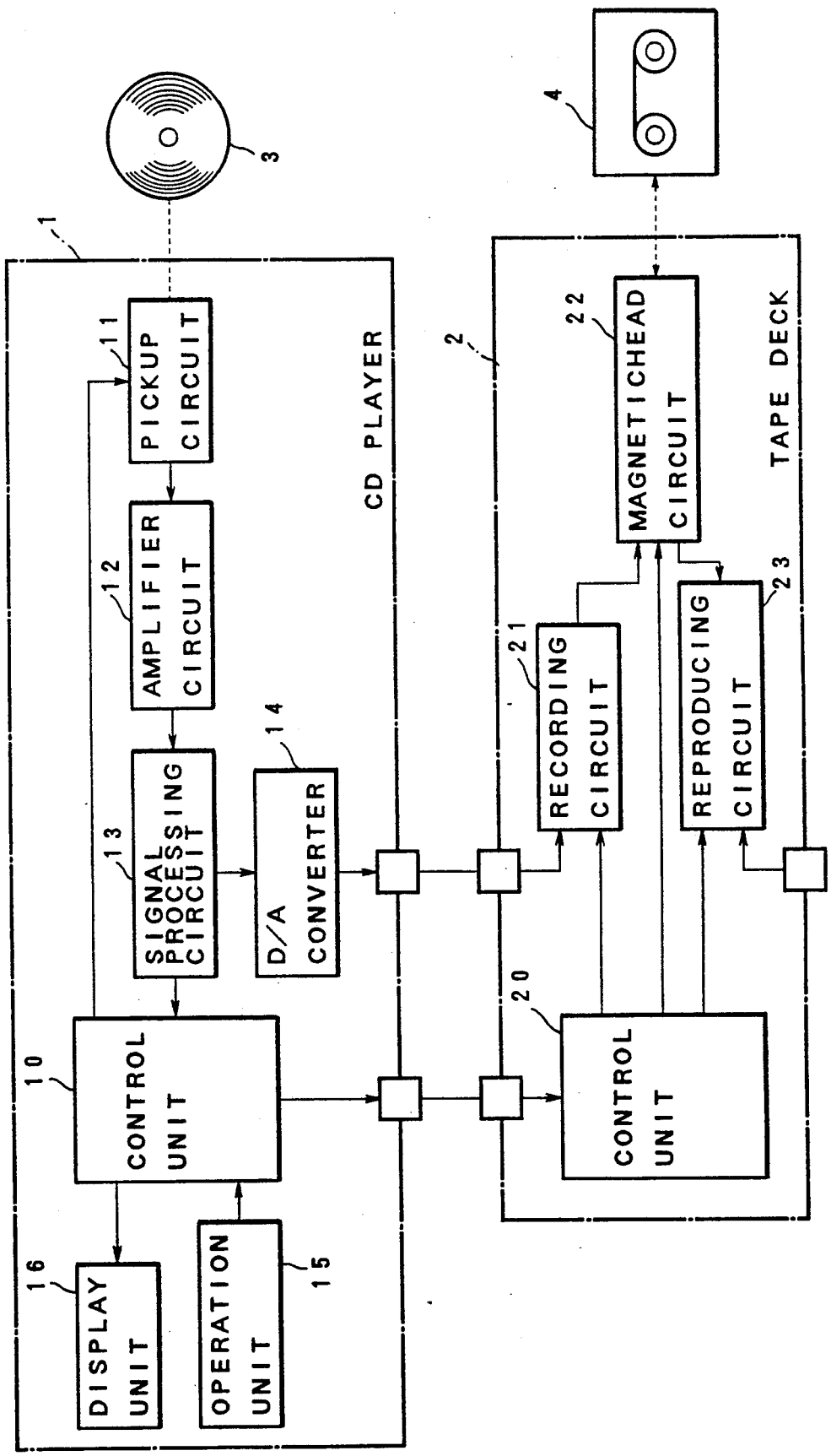
FIG. 1 is a block diagram of a dubbing apparatus for audio equipment as one embodiment of the invention.

FIG. 1 is a block diagram showing one embodiment of a dubbing apparatus for audio equipment according to this invention. This apparatus consists of a CD player 1 and a tape deck 2. The CD player 1 reads table-of-contents (TOC) information and music information recorded on a CD 3 and converts the music information into a music signal and record it on a magnetic tape 4 through the tape deck 2.

The CD player 1 has a control unit 10 composed of a microcomputer and, according to the control from the control unit 10, reads the TOC information and music information from the CD 3 through a pickup circuit 11. The information thus read out is amplified by an amplifier circuit 12 and separated into TOC information and music information by a signal processing circuit 13. The TOC information is sent to the control unit 10 and the music information to a digital-to-analog (D/A) converter 14. The D/A converter converts the music information supplied from the signal processing circuit 13 into an analog signal, which is then outputted as a music signal to the tape deck 2. The control unit 10 checks the TOC information separated by the signal processing circuit 13 to detect the number of pieces of music, total recorded time, and the playback time of each piece of music recorded on the CD 3, and at the same time checks the condition of each operation switch on an operation unit 15. The detected TOC information and the operation switch statuses are indicated on a display unit 16. The control unit 10 also issues control signal for recording, stopping and rewinding to the tape deck 2.

The tape deck 2 has a control unit 20 composed of a microcomputer and, according to the control from the control unit 20, performs actions such as recording, playback and rewinding and also a bias control (described later) during a cross fade. The control unit 20 feeds the music signal sent from the CD player 1 to a recording circuit 21 and then to a magnetic head circuit 22, from which the music signal is recorded into the magnetic tape 4. The music signal recorded on the magnetic tape 4 is read out by the magnetic head circuit 22 and amplified by a reproducing circuit 23 before being outputted to an external circuit.

Figure 2:
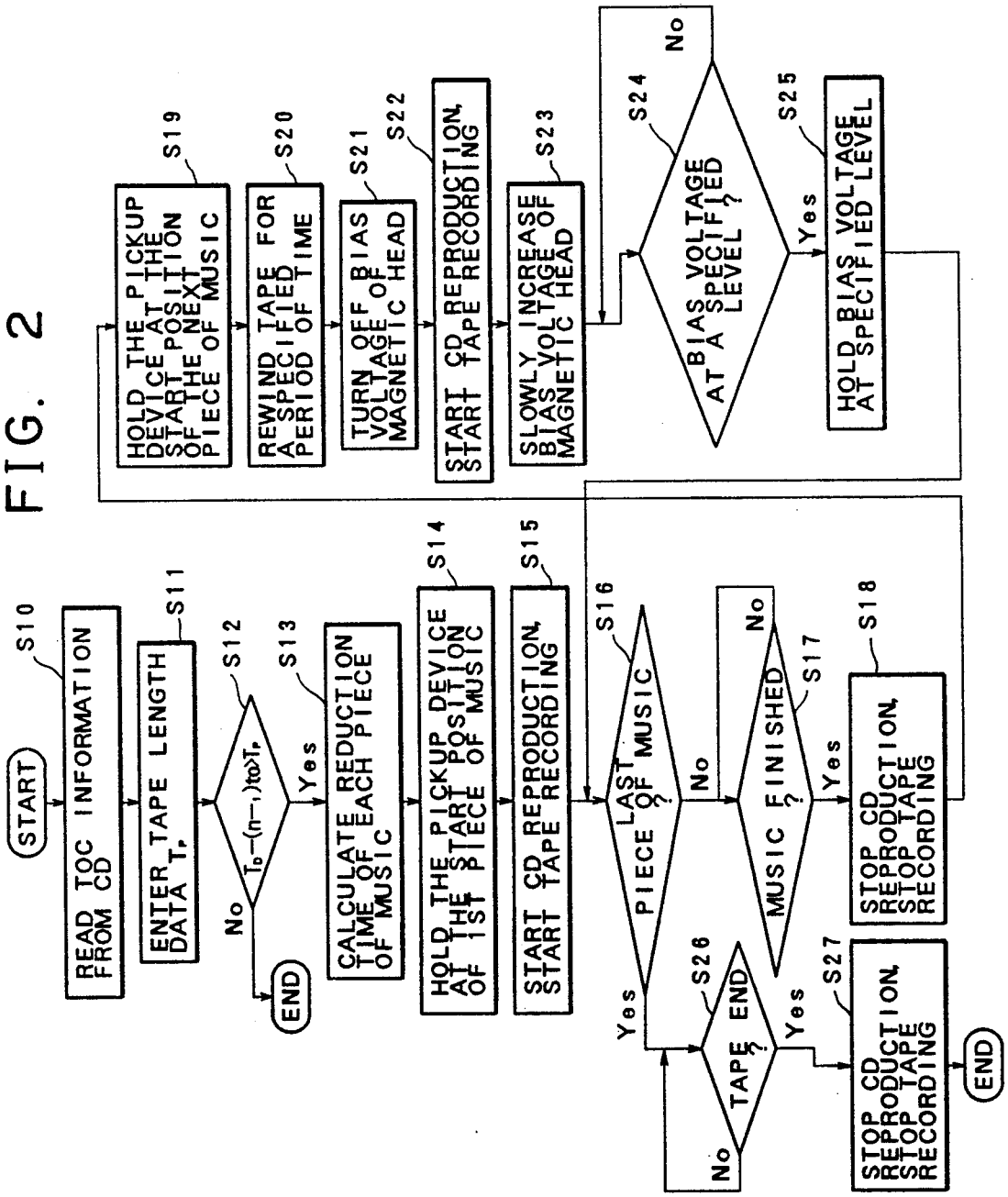
FIG. 2 is a flowchart showing the sequence of operation of the dubbing apparatus of FIG. 1.

Next, we will explain about the dubbing operation by referring to the flowchart of FIG. 2.

When the user presses a dubbing key on the operation units 15 of the CD player 1, the control unit 10 reads a program for dubbing process shown in FIG. 2 from a built-in program memory and executes the dubbing processing.

The control unit 10 first sends a control signal to the pickup circuit 11 to position the pickup device at a read-in portion of the CD 3 and reads the TOC information to store information such as the total recorded time and the playback time of each piece of music in memory (step S10). Next, the control unit 10 stores in memory the recordable time $T_P$ of the magnetic tape entered by the user from the ten-key on the operation unit 15 (step S11). Then at step S12, it checks whether or not the total playback time of n pieces of music to be recorded $T_D$ minus the cross fade times $T_)$ set between each piece of music, i.e. $T_D-(n-1)T_O$, is larger than the recordable time $T_P$ of the magnetic tape 4. In other words, it checks whether the condition $T_D-(n-1)T_O > T_P$ holds or not. If the time $T_P$ is found to be larger than the time $T_D-(n-1)T_O$, the control unit 10 decides that the condition does not hole or makes a "no" decision and stops the processing. In this case, the user may or may not replace the magnetic tape with other tape 4 whose recordable time $T_P$ is shorter, or the control unit 10 may resume processing to perform the cross fading without shortening the playback time of each piece of music.

At step S12, if the time $T_D-(n-1)T_O$ is greater than the time $T_P$, the control unit 10 decides that the above-described condition holds or makes a "yes" decision and calculates a playback reduction time $t_c$ for each piece of music so that the n pieces of music an be recorded within the recordable time $T_P$ of the magnetic tape 4 (step S13). The reduction time $t_c$ may be set to a single common value for all pieces of music or may be made proportional to the playback time of the individual pieces of music.

Then, the control unit 10 issues a control signal to the pickup circuit 11 to move the pickup device to the start position of the first piece of music on the CD 3 and keep it standing by (step S14). After this, the control unit 10 sends a control signal to the pickup circuit 11 to start reading the music information of the first piece of music and at the same time sends a control signal to the control unit 20 of the tape deck 2 to set the tape deck 2 in a recorded mode (step S15). As a result, the music information of the first piece of music on the CD 3 is reproduced by the CD player 1 and copied through the tape deck 2 into the magnetic tape 4.

Then, it is checked whether the piece of music currently being dubbed is the last one on the CD (step S16). In this instance, because it is not the last music, the control unit 10 makes a "no" decision and then checks if the current music is finished (step S17). When that piece of music ends, the control unit 10 stops the reproduction by the CD player 1 of CD 3 and at the same time sends a control signal to the control unit 20 of the tape deck 2 to switch the tape deck 2 to the stop mode (step S18). Next, the control unit 10 issues a control signal to the pickup circuit 11 to move the pickup device to the start position of the next piece of music to be reproduced and keeps it standing by (step S19).

The next step the control unit 10 takes is to transmit a control signal to the control unit 20 of the tape deck 2 to rewind the magnetic tape 4 for a specified period of time (step S20). The rewinding time is the sum of the reduction time $t_c$ of the recorded piece of music calculated at step S13 and the cross fade time $t_O$ set between pieces of music, i.e. $t_c+t_O$. The control unit 10 then turns off a bias circuit of the magnetic head circuit 22 (step S21) and in this condition issues a control signal to the pickup circuit 11 to start reading information from the CD 3. At the same time, the control unit 10 sends a control signal to the control unit 20 to set the tape deck 2 to the record mode (step S22). After this, the control unit 10 slowly oscillates the bias oscillation circuit of the magnetic head circuit 22 (step S23) until a specified bias level is reached a specified time $t_O$ later (step S24). The bias level is held at this level thereafter throughout the recording of this music (step S25). The program then returns to step S16.

Figure 3:
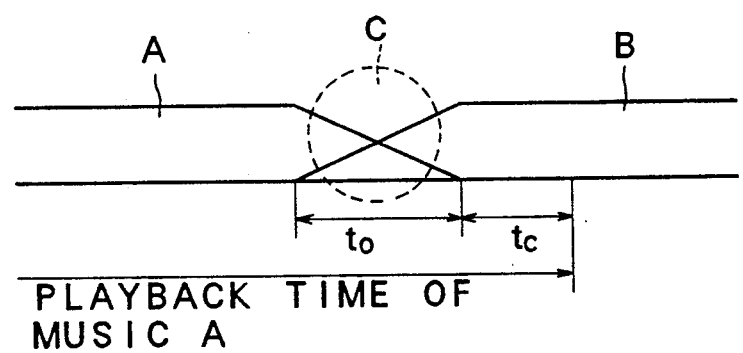
FIG. 3 is a schematic diagram showing the recorded condition of music signals on a magnetic tape.

With the above steps taken, a cross fade portion C lasting the period $t_O$ is formed between the adjacent pieces of music, as shown in FIG. 3, in which the fading-out portion of the preceding piece of music A is overlapped with the fading-in portion of the succeeding piece of music B, thus reducing the overall music recording time by $t_c+t_O$.

If the music currently being dubbed is the last piece of music, the control unit 10 makes a "yes" decision at step S16 and, when the end of the magnetic tape 4 is detected (step S26), stops reproduction by the CD player 1 of the CD 3. At the same time, the control unit 10 sends a control signal to the control unit 20 of the tape deck 2 to change the tape deck 2 to the stop mode (step S27) and terminates the processing.

While in the above embodiment, the magnetic tape rewinding time is taken as the sum of the reduction time $t_c$ of a piece of music and a cross fade time $t_O$ between the adjacent pieces of music, i.e. $t_c+t_O$, it is also possible to shorten the recording time of each piece of music by time $t_c$ and set the rewinding time equal to only the cross fade time $t_O$.

In the above example, the recordable time $T_P$ of the magnetic tape is entered manually by the user from the ten-key of the operation unit 15. The recordable time $T_P$ may be made automatically detectable either by detecting the reel shaft speed when the magnetic tape starts to be wound or by actually performing the forward feed operation.

Further, in the above embodiment, the operation, display and control are all performed by the CD player. These may be partly or totally carried out by the tape deck.

Moreover, the cross fade time, which in the above embodiment is set to a constant time $t_O$, may be varied depending on the length of individual pieces of music.

With this invention, even when the total recorded time of plural pieces of music recorded on a CD is longer than the recordable time of a magnetic tape, it is possible to dub all pieces of music into the magnetic tape by shortening the recording time allocated to individual pieces of music and providing a cross fade portion between the adjacent pieces of music, as long as the difference between the CD recorded time and the magnetic tape recordable time is within a specified range.

What is claimed is:

1. A dubbing apparatus for audio equipment comprising:

a reproducing device for reproducing a plurality of pieces of music recorded on one of an optical disk and a digital audio tape and outputting the reproduced music as music signals; and a recording device having a magnetic head circuit for dubbing the reproduced music signals to a magnetic tape, said recording device stopping a recording operation each time the reproduction of each piece of music is completed, rewinding the magnetic tape for a duration equal to the sum of a reduction time of the recorded piece of music and a cross fade time, and restarting the recording operation form the rewound position, wherein the music signal of a next piece of music is reproduced by the reproducing device while at the same time gradually lowering the recording level of the previously recorded piece of music for the duration of the cross fade time, thus overlapping the two adjacent pieces of music in the cross fade time, said reduction time representing a portion of each reproduced music piece which is deleted from each corresponding recorded music piece, to enable all of said reproduced music pieces to be re-recorded.

2. A dubbing apparatus as claimed in claim 1, wherein said reduction time of the recorded piece of music is a single common value for all pieces of music.

3. A dubbing apparatus as claimed in claim 1, wherein said reduction time of the recorded piece of music is made proportional to the playback time of the individual pieces of music.

4. A dubbing apparatus as claimed in claim 1, wherein said cross fade is generated by a bias control of said magnetic head circuit.

5. A dubbing apparatus as claimed in claim 1, wherein said recording device repeats said stopping, rewinding and restarting operations between each of said reproduced music pieces.

6. A dubbing apparatus as claimed in claim 1, wherein said reduction time is based upon a difference between a total reproduction time for the plurality of musical pieces to be reproduced and a total recording time of said magnetic tape.

7. A dubbing apparatus as claimed in claim 1, further comprising an operation unit for manually entering a total recording time of said magnetic tape.

8. A dubbing apparatus as claimed in claim 1, further comprising:

memory for storing an amount of recordable time remaining on the magnetic tape and a total playback time for the plurality of music pieces, and a controller for determining the reduction based upon a comparison between the recordable time and the playback time minus a cumulative cross fade time between each piece of music.

* * * * *